US009509833B2

(12) United States Patent
Yablokov et al.

(10) Patent No.: US 9,509,833 B2
(45) Date of Patent: Nov. 29, 2016

(54) SYSTEM AND METHOD CONTROLLING ACCESS TO APPLICATIONS ON A MOBILE DEVICE

(71) Applicant: Kaspersky Lab ZAO, Moscow (RU)

(72) Inventors: Victor V. Yablokov, Moscow (RU); Evgeny Y. Eliseev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 105 days.

(21) Appl. No.: 14/312,888

(22) Filed: Jun. 24, 2014

(65) Prior Publication Data

US 2015/0341484 A1 Nov. 26, 2015

(30) Foreign Application Priority Data

May 26, 2014 (RU) ................................ 2014121024

(51) Int. Cl.
| | |
|---|---|
| *H04M 1/68* | (2006.01) |
| *H04M 1/725* | (2006.01) |
| *H04W 12/08* | (2009.01) |
| *G06F 21/62* | (2013.01) |
| *H04M 1/67* | (2006.01) |

(52) U.S. Cl.
CPC ........ *H04M 1/72577* (2013.01); *G06F 21/629* (2013.01); *H04W 12/08* (2013.01); *H04M 1/67* (2013.01); *H04M 1/72522* (2013.01)

(58) Field of Classification Search
CPC .................... H04M 1/72577; H04M 1/72522; H04W 12/08
USPC .......................................................... 455/410
See application file for complete search history.

(56) References Cited

U.S. PATENT DOCUMENTS

| | | | |
|---|---|---|---|
| 5,682,535 A | 10/1997 | Knudsen | |
| 7,185,073 B1 | 2/2007 | Gai et al. | |
| 8,146,134 B2 | 3/2012 | Bechtel et al. | |
| 2013/0254660 A1* | 9/2013 | Fujioka | .................. A63F 13/12 |
| | | | 715/707 |
| 2014/0032733 A1 | 1/2014 | Barton et al. | |
| 2014/0040638 A1 | 2/2014 | Barton et al. | |
| 2014/0040979 A1 | 2/2014 | Barton et al. | |
| 2014/0096186 A1 | 4/2014 | Barton et al. | |
| 2015/0195712 A1* | 7/2015 | Pinheiro | .......... H04W 28/0289 |
| | | | 455/411 |
| 2015/0264558 A1* | 9/2015 | Wigton | ................ G06K 9/0061 |
| | | | 455/418 |

FOREIGN PATENT DOCUMENTS

RU 2408069 C2 12/2010

* cited by examiner

*Primary Examiner* — Amancio Gonzalez
(74) *Attorney, Agent, or Firm* — Arent Fox LLP; Michael Fainberg

(57) ABSTRACT

Disclosed are systems and methods for controlling access to applications of a mobile device. An example method includes collecting, by a controlled shell of an OS of the mobile device, information about an application of the user device; determining a category designation of the application based on the collected information; determining, by the controlled shell, whether the category designation of the application complies with one or more rules of a usage policy of the mobile device; blocking user access to the application if it is determined that a rule exists prohibiting use of applications in the designated category or if no rule exists permitting use of the applications in the designated category; and permitting user access to the application if it is determined that a rule exists allowing use of applications in the designated category or if no rule exists prohibiting use of the applications in the designated category.

26 Claims, 6 Drawing Sheets

SYSTEM AND METHOD CONTROLLING ACCESS TO APPLICATIONS ON A MOBILE DEVICE

CROSS-REFERENCE TO RELATED APPLICATIONS

The present disclosure claims benefit of priority under 35 U.S.C. 119(a)-(d) to a Russian Application No. 2014121024 filed on May 26, 2014, which is incorporated by reference herein.

TECHNICAL FIELD

The present disclosure relates generally to the field of access control and, more specifically, to systems and methods for controlling access to applications on a mobile device.

BACKGROUND

Today the number of mobile computing devices is growing and they have penetrated all spheres of human life. The most popular among them are mobile phones, smartphones, notebooks, communicators, and navigation systems. Mobile devices are used as a means of communication, work and entertainment. In tandem with the development of these devices, wireless means of communication are also being developed and are inseparable therefrom. The transfer of data from one device to another and the exchange of information are tasks which cause no difficulty even for an inexperienced user of these devices.

Modern mobile devices are very popular not only among an adult audience, but are also being actively used by children and adolescents, and they afford the possibility of accessing the Internet practically anywhere and at any time of the day. The Internet contains various information, often oriented only to an adult user audience. For example, some information is of a pornographic nature and may be found on various dating sites. Obviously, such informational resources should be closed to visits by children.

Yet every year there are more and more children and adolescents visiting the Internet and trying to learn about it and use its possibilities. The Internet allows them to learn, to grow, and to be part of a virtual classroom. At the same time, young Internet users are often unprepared to adequately take in the data that are found and obtained there, which might be inappropriate, untrustworthy, or dangerous, and consequently may cause harm not only to the computer, but also to the users themselves. There are applications which may be inappropriate to a varying degree for children of various age groups, such as: gaming applications; application with in-game shopping; applications with a large number of rights (access to sending of SMS, for example); applications with a high ESRB rating; and others.

Thus, there is a need to develop parental control technologies to protect children from applications not suitable to their age category.

SUMMARY

Disclosed are aspects of systems, methods and computer program products for controlling access to applications on mobile devices based on categorization of the application. The technical result of the present aspects is to increase the safety of use of mobile devices, which is accomplished by preventing the use of applications on a mobile device that do not conform to the usage policy of the mobile device.

According to an aspect, an example method for controlling access to applications of a mobile device comprises: collecting, by a controlled shell of an operating system (OS) of the mobile device, information about at least one application of the user device; determining a category designation of the application based on the collected information; determining, by the controlled shell, whether the category designation of the application complies with one or more rules of a usage policy of the mobile device; blocking, by the controlled shell, user access to the application if it is determined that a rule exists prohibiting use of applications in the designated category or if no rule exists permitting use of the applications in the designated category; and permitting, by the controlled shell, user access to the application if it is determined that a rule exists allowing use of applications in the designated category or if no rule exists prohibiting use of the applications in the designated category.

In another example, the information pertaining to the application includes at least one of application metadata, a hash sum of the application, a name of the application, a license agreement, user instructions, name of company that developed the application, multimedia content, registry key information, age-rating information, drivers, and libraries In another example, permitting use of the application includes permitting use of the application with one or more restrictions that include at least a restriction on time of use, a restriction on duration of use, a restriction on use based on a geographic location of the mobile device, a restriction on use of resources of the mobile device, and a restriction on use based on an active user account In another example, the method further comprises checking after a boot sequence of the mobile device category designations of all applications present on the mobile device; determining whether the category designations of each of the applications complies with the one or more rules of a usage policy of the mobile device; and blocking or permitting use of each of the applications based on the determination.

In another example, the method further comprising sending the information pertaining to the application to a categorization module, wherein the categorization module determines the category designation of the application based on the information.

In another example, if the categorization module determines that the category designation of the application is inconclusive, the categorization module generates a probability distribution indicating how likely it is that the application belongs to one or more categories.

In another example, the method further comprises assigning the application to a first category that is indicated as being a most likely category for the application; or assigning the application to a second category that is indicated as being a less likely category for the application with one or more restrictions on a use of the application.

In another example, the controlled shell is a desktop of the OS that includes clickable shortcuts configured to launch applications.

According to yet another aspect, an example system for controlling access to applications of a mobile device comprises: a hardware processor configured to executed a controlled shell of an operating system (OS) of the mobile device, wherein the controlled shell is configured to collect information about at least one application of the user device; a categorization module configured to determine a category designation of the application based on the collected information; the controlled shell further configured to determine whether the category designation of the application complies with one or more rules of a usage policy of the mobile device; the controlled shell further configured to block user access to the application if it is determined that a rule exists prohibiting use of applications in the designated category or if no rule exists permitting use of the applications in the designated category; and the controlled shell further configured to permit user access to the application if it is determined that a rule exists allowing use of applications in the designated category or if no rule exists prohibiting use of the applications in the designated category.

According to yet another aspect, an example computer program product stored on a non-transitory computer readable medium, for controlling access to applications of a mobile device, the computer program product includes computer executable instructions for: intercepting, by a controlled shell of an operating system (OS) of the mobile device, a user request to access an application on the mobile device; collecting information about the application; determining a category designation of the application based on the collected information; determining, by the controlled shell, whether the category designation of the application complies with one or more rules of a usage policy of the mobile device; blocking, by the controlled shell, access to the application if it is determined that a rule exists prohibiting use of applications in the designated category or if no rule exists permitting use of the applications in the designated category; and permitting, by the controlled shell, access to the application if it is determined that a rule exists allowing use of applications in the designated category or if no rule exists prohibiting use of the applications in the designated category.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for controlling access to applications on a mobile device. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Any mobile device is generally under the control of a mobile operating system (hereafter, OS). Such mobile OSs are, for example: Android, iOS, Symbian, BlackBerry OS, Windows Phone and so on. The applications installed on devices access the resources of the mobile device, including the communication ports, across interfaces which are provided by the operating system. The applications contain various data or enable access to such. It is therefore necessary to restrict the use by the users of applications not conforming to the usage policy of the mobile device. A usage policy of a mobile device includes the set of rules which govern the use of the mobile device. One possible example of such a policy is shown below:

use of applications of "Game" category is permitted only after 6:00 p.m. and for not longer than two hours a day;
    ban on applications from a given list using telephone functions to determine location;
    on school days, from 8:00 a.m. to 5:00 p.m., it is only permitted to use applications necessary for learning;
    the use of applications only for a younger age group is allowed.

The age categories of applications may be based on:
    the content which such applications may provide (such as images which may be shown when using the applications);
    any given services, functions or components to which the application is connected (such as a geolocating service).

The resources of a mobile device include components which may be allocated to a data processing process for a particular block of time. The primary resources of a computer system are the processor(s), the main memory, data storage devices and peripherals. The interface provided by the operating system for interaction with the resources of the device may be realized in the form of API (application programming interface) functions. With their help, the application may interact with the network, perform operations with files, with memory, and so on.

Figure 1A:
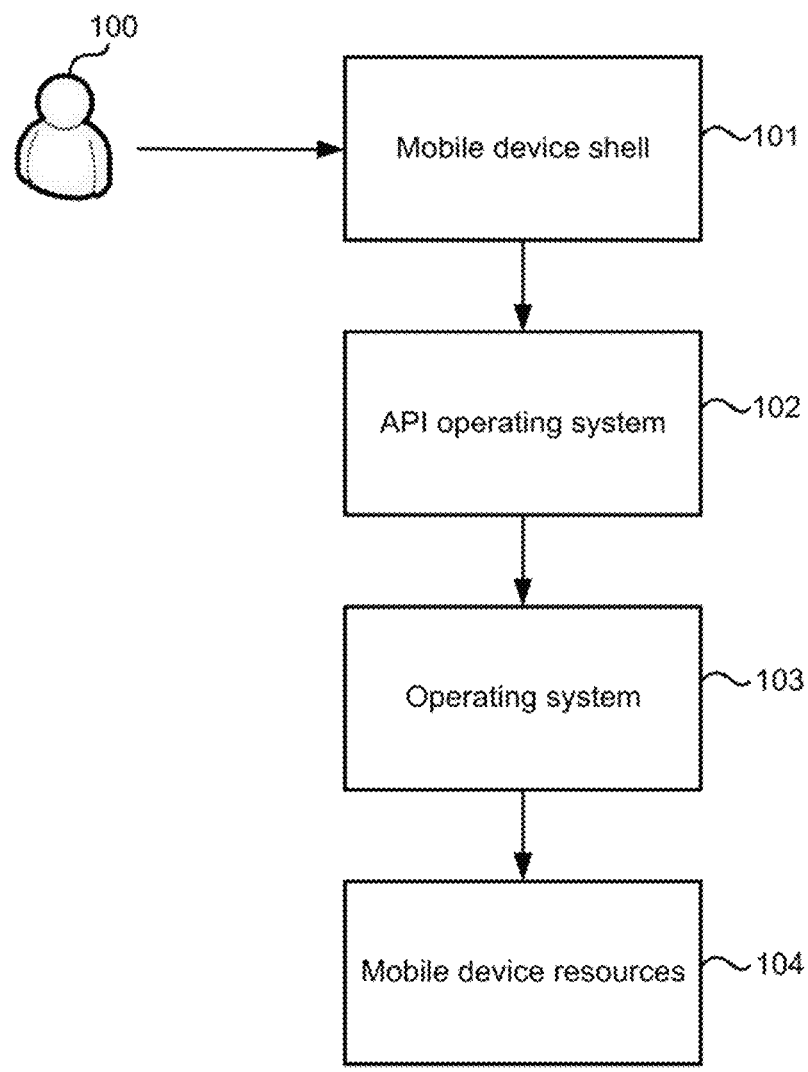
FIG. 1A shows an example aspect of an operating scheme of a mobile device of a system for controlling access to applications on a mobile device.

FIG. 1A shows a typical operating scheme of a mobile device. In all operating systems of modern smartphones, by analogy with Windows, there is a desktop or shell for the mobile device 101 (for Microsoft Windows® this shell is realized with the help of the application "explorer.exe"), which is used to run applications. It is precisely the shell of the mobile device 101 which the user 100 runs applications with, by clicking on shortcuts. The shell of the mobile device is also used for quick-starting applications, calling up the command line, and so on. For example, on Samsung® smartphones, the shell is called TouchWiz. The shell of the mobile device 101 through the API functions of the operating system 102 calls upon the operating system 103, and this organizes direct access to the resources of the mobile device 104. The shell of a mobile device 101 is an application of the mobile device by which the user runs other applications. All of the applications, like the shell of the mobile device 101 as well, interact with the resources of the mobile device 104 via the API functions of the operating system 102.

By gaining control over the shell of a mobile device 101, one may gain control over the execution of applications, changing the settings of the device (such as the settings for access to Wi-fi wireless networks), and many other functions. In the general case, control of the shell of a mobile device 101 may control and regulate the actions of a child by the usage policies of the mobile device. Control may be organized in four different ways:

1. Creating a special mobile shell and blocking (i.e., replacing) the standard one.
2. Joint equitable use of two shells of the mobile device—one safe and controlled (for a child), the other unsafe (for an adult).
3. Joint dependent use of two shells of the mobile device—the master and the slave shell—one of which is run under the other one and controls its activity.
4. Integration of protection technologies in the standard shell of the manufacturer of the mobile device (such as in TouchWiz).

The differences in these four methods lie in the area of technology application. There are different approaches to solving problems in the area of parental control and other technologies. The most effective from the standpoint of protection is the first method—replacing the standard shell of the mobile device. In this case, all the actions of the child occur from a controlled application (the shell of the mobile device 101) and they may be logged (to inform the parent), blocked, or modified. In one example aspect, it is possible to run all applications in a "sandbox" to organize control of all the actions of the application on the basis of the usage policies of the mobile device. Thus, it is possible to limit the actions of a child, for example: prevent the sending of SMS through all applications, and not just the standard one; check all URLs being accessed, and not just the URLs which are accessed in the standard browser; notify the parents as to all actions of the child, and so on.

In one example aspect, the described technology for use of the shell of the mobile device 101 enables specifying an application or category of applications which a child is permitted to use. The technology also enables placing limits on the functions executed by applications (access to network, to telephone, and so on), performing a filtering of data, placing limits on time (for example, applications belonging to the "Game" category may only be run after 6:00 p.m. with a total time of working with the applications of not more than two hours a day). For example, a parent allows a child to install new applications, but does not want the child to install applications which are not age appropriate. For this, in one example aspect, an application categorization module (e.g., categorization service) may be used to provide data on the category of the application being analyzed, and on this basis only applications appropriate to the particular child are permitted for use.

Figure 1B:
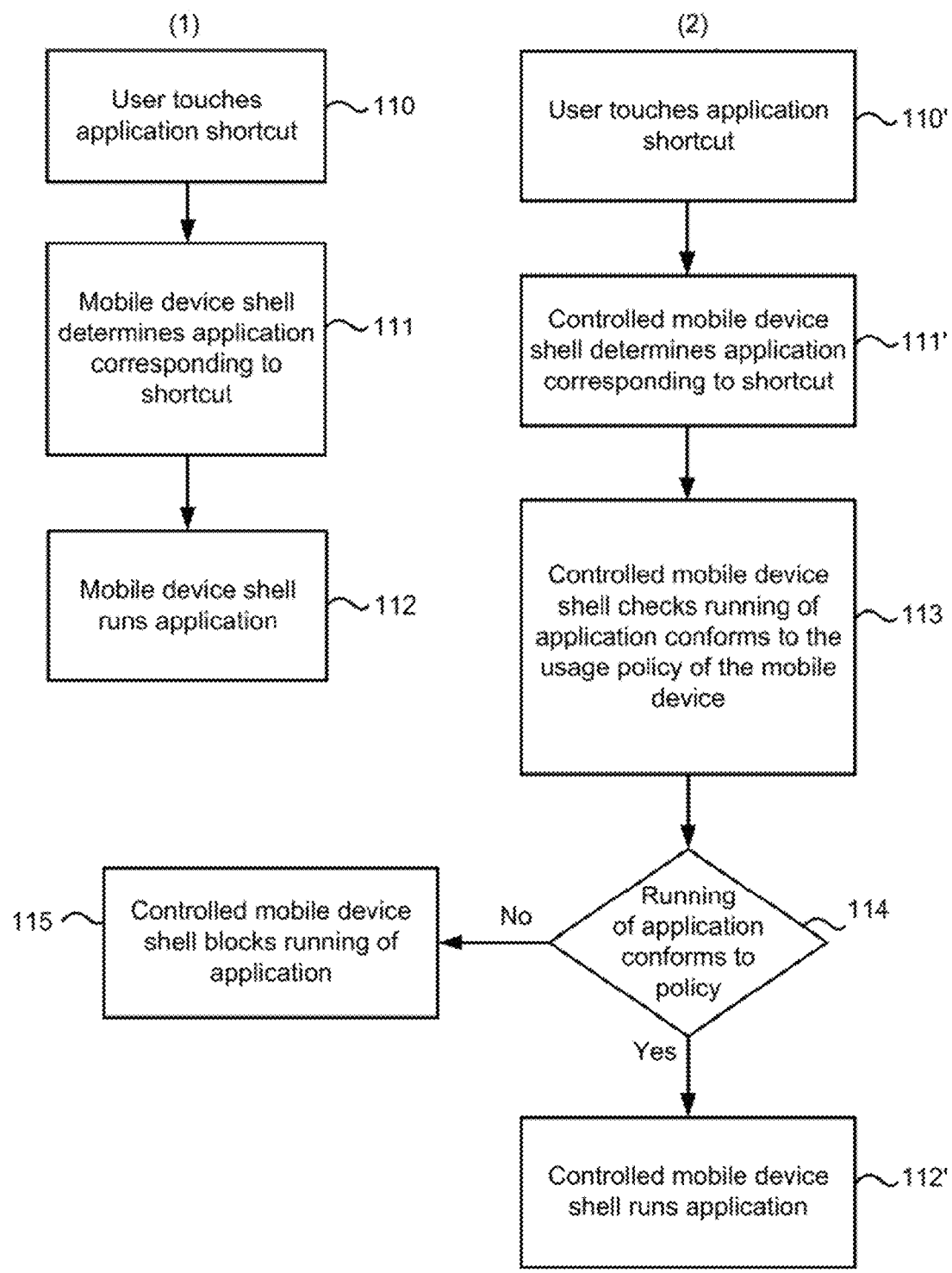
FIG. 1B shows example aspects of a user running an application on a mobile device with a standard mobile shell and with a controlled mobile shell of a system for controlling access to applications on a mobile device.

FIG. 1B shows examples of a user running applications on a mobile device from a standard mobile shell and from a controlled mobile shell. An example of the running of an application on a mobile device with a standard mobile shell is designated in the drawing as the first example aspect(1).

An example of the running of an application on a mobile device with a controlled mobile shell is designated as the second example aspect(2). The control of the running of an application by the user is shown only for purposes of illustration and in no way limits the control of other actions of the user, which may include, for example, removal of an application and other actions performed by the user using the mobile device shell.

According to the first example aspect, in step 110 the user activates (e.g., touches with a finger or using mouse pointer) the application shortcut, depicted in the mobile device shell, to run an application. The mobile device shell determines the application corresponding to the shortcut in step 111 and starts it in step 112.

According to the second example aspect, in step 110' analogous to step 110 of the first example the user activates the application shortcut, depicted in the mobile device shell, to run an application. Then, in step 111' the controlled mobile device shell determines the application corresponding to the shortcut. In one example aspect, if the category of the given application is not known, the controlled mobile device shell with the aid of a collecting module may collect metadata pertaining to the application and send the collected metadata to a remote categorization module to determine the category of the application. In one example aspect, the categorization module may be implemented locally on the mobile device. In step 113 the controlled mobile device shell checks whether the running of the given application conforms to the usage policy of the mobile device. The checking for compliance with the usage policy of the mobile device may be done both in regard to the application itself and the category to which the application belongs. The usage policy of the mobile device may contain allowing and/or prohibiting rules, for example: an allowing rule—to allow the running of the Facebook application; a prohibiting rule—to prohibit the running of applications belonging to the category 18+. In the general case, the checking for compliance with the usage policy of the mobile device concludes with a search for rules pertaining to the application or the categories of the given application which allow or prohibit the use of the given application. If there is a rule in the usage policy of the mobile device which prohibits the use of an application, or there is no rule allowing the use of an application, then that application does not conform to the usage policy of the mobile device. But if the usage policy of the mobile device has no rule prohibiting the use of an application, or if there is a rule allowing its use, then the given application conforms to the usage policy of the mobile device. Rules conforming to the usage policy of a mobile device may contain additional conditions, for example, a date, time, length of the work session, and other conditions, as well as specific actions disclosing a example of use of the given application, such as running, deleting, updating and others. That is, the running of an application may be allowed, but with certain restrictions, at least of the following kind:

restrictions on time, including restrictions both on the length of use and on the time slots (for example, use of applications for Internet access is restricted to the daytime);

restrictions on geographical location (for example, running of games and applications for access to social networks is allowed outside school grounds);

restrictions on the use of resources of the mobile device (for example, use of an application is allowed with restriction on the use of the camera of the mobile device); and restrictions on the account record (different restrictions may be placed on the identical application, depending on the current account record being used, for example, if the account record is the parent's then the use of any applications is allowed without any restrictions that apply in the case of the child's account record).

It is also possible to use any given combination of the aforementioned restrictions. Thus, in accordance with the second example aspect shown in FIG. 1B, if in step 114 the controlled mobile device shell determines that the running of an application conforms to the usage policy of the mobile device, then in step 112' this application will be run, but if the running of the application does not conform to the usage policy of the mobile device, then in step 115 the running of this application is blocked. Furthermore, the shortcut of an application which cannot be run, even with restrictions, may be hidden by the controlled mobile device shell.

Figure 1C:
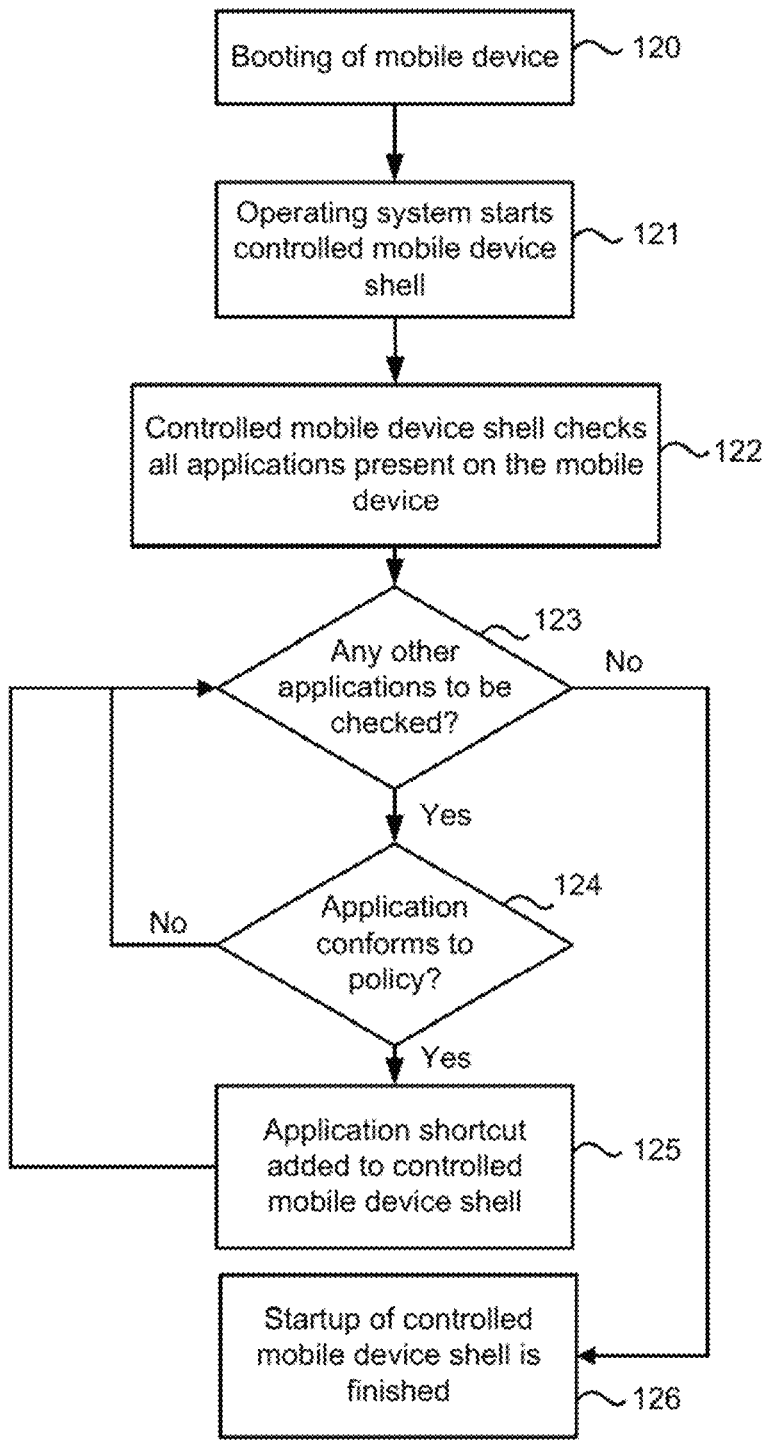
FIG. 1C shows an example aspect of running a mobile device with a controlled mobile device shell of a system for controlling access to applications on a mobile device.

FIG. 1C shows an example of running a mobile device with a controlled mobile device shell. According to this example, in step 120 the mobile device is booted, as a result of which the operating system in step 121 starts the controlled mobile device shell. After startup, in step 122 the controlled mobile device shell begins to check all applications present on the mobile device. If, in step 123, there is an unchecked application, it will be checked in step 124 for compliance with the usage policy of the mobile device. The shortcuts of applications conforming to the usage policy of the mobile device are added in step 125 to the controlled mobile device shell. If there are no unchecked applications in step 123, the startup of the controlled mobile device shell is finished in step 126, after which only the applications conforming to the usage policy of the mobile device are available for use. If the category is not known when checking an application for compliance with the usage policy of the mobile device in step 124, the controlled mobile device shell with the aid of the collecting module may collect metadata pertaining to the application, and send the collected metadata to a remote categorization module for determination of the category of the application.

Figure 2:
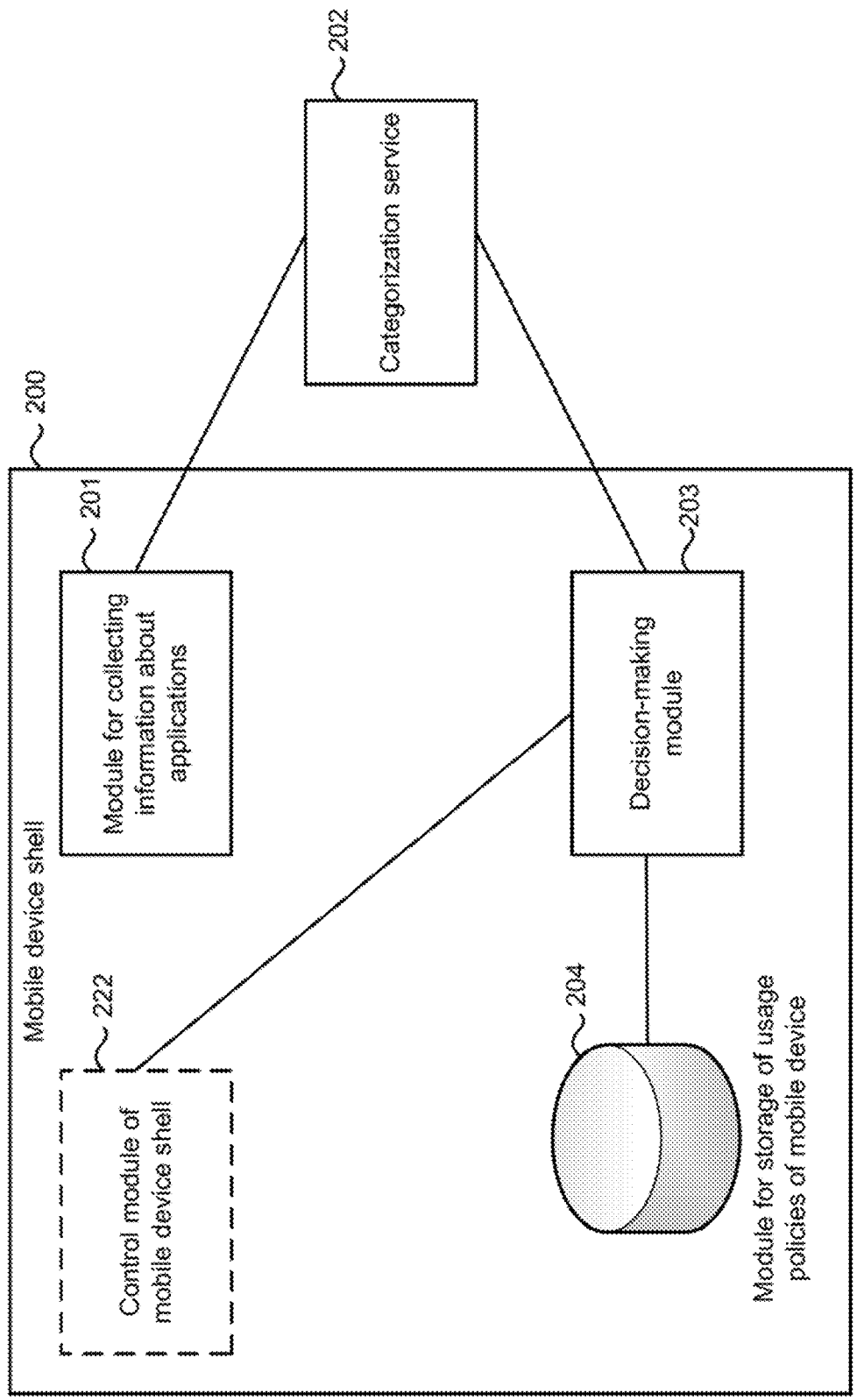
FIG. 2 shows an example aspect of a block diagram of a system for controlling access to applications on a mobile device.

FIG. 2 shows a detailed diagram of a system of blocking the use of applications on a mobile device. This diagram depicts a mobile device shell 200, which together with a control module of the mobile device shell 222 becomes a controlled mobile device shell. In one example aspect, the control module of the mobile device shell may be integrated in a standard mobile shell. In another example aspect, control of the shell may be accomplished by replacing the standard mobile shell with the controlled mobile device shell.

The diagram also depicts a collecting module 201, which collects metadata pertaining to applications and sends the collected metadata to the categorization module 202. The metadata may be any data, parameters and characteristics pertaining to the application, such as:
- the hash sum of the application or its distribution package (installation packet of the application);
- the name of the application and any other text data, including license agreements with the end user (EULA—end user license agreement), instructions for the user, the name of the company that developed the application;
- graphic and video content (multimedia content);
- registry keys and their values;
- the values of the ESRB (ESRB organization), PEGI (PEGI organization) and other regional commissions for age-rating applications;
- the drivers and libraries used, and so on.

The categorization module 202 may be a local module or a remote server designed to analyze applications and their associated metadata for the purpose of assigning them to a particular category. If as a result of the analysis of the metadata it is not possible to accurately determine the category of the application, the categorization module 202 will send to a decision-making module 203 a probability distribution, showing how likely it is that the application belongs to one category or another. In the course of the analysis, metadata is studied for the presence of features indicating the belonging of the application to one category or another, for example, the use by an application of graphic libraries (such as OpenGL ES) may indicate that application belongs to the "Games" category. Any indication of belonging to a particular category increases the likelihood of the application belonging to that category, thus after the analysis in the context of one classification (such as a classification of applications by age categories or by functionality) it is possible to form a probability distribution of possible categories of the application. Conditions such as thresholds may be used to select a category from the probability distribution. If the threshold has not been passed (or any other conditions imposed), then the categorization module 202 may send the probability distribution to the decision-making module 203. The decision-making module 203, which is connected by the storage module 204 for storage of usage policies of the mobile device, may in turn select, for example, the most likely category of the application or assign the application to a less likely category, but with more stringent requirements (for example, the requirements may become more stringent the younger the age group). By stringent is meant the number of prohibitions and restrictions in effect for the category (the more of these, the more stringent the requirements) in accordance with the usage policy of the mobile device. In one example aspect, the decision-making module 203 is implemented in the form of the mobile device shell. The decision-making module 203 determines whether to block or allow the use of an application on the mobile device based on the compliance of the application's category with the usage policy of the mobile device as selected from the storage module 204. Thus, if the category of the application does not conform to the selected usage policy of the mobile device, the use of the application is blocked; and if it conforms, then it is allowed.

Figure 3:
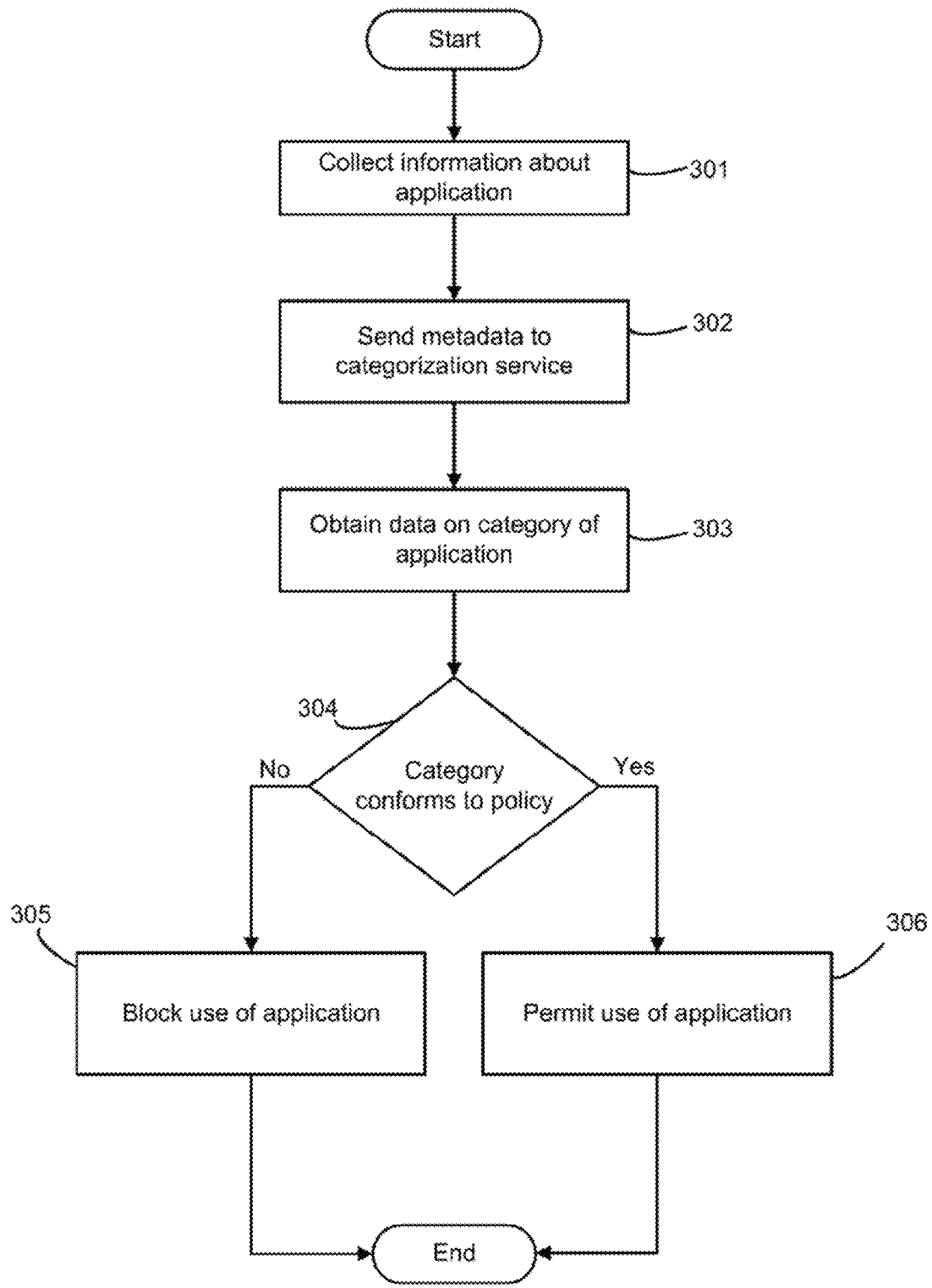
FIG. 3 shows an example aspect of a flow diagram of a method for controlling access to applications on a mobile device.

FIG. 3 shows a block diagram of a method of blocking the use of an application on a mobile device. According to the diagram, in step 301 the collecting module collects metadata information about the application. After this, in step 302, the collected metadata are sent to the categorization module 202, which analyzes the collected metadata to determine the category of the application. Then, in step 303, the decision-making module 203 in the form of the mobile device shell obtains data as to the category of the application. In step 304 it also compares the obtained data on the category of the application with the usage policies of the mobile device from the storage module 204 for storage of usage policies of the mobile device. If the category of the application does not conform to the specified usage policy of the mobile device, then in step 305 the decision-making module 203 blocks the use of the application. But if the category of the application conforms to the specified usage policy of the mobile device, then in step 306 the decision-making module 203 allows the use of the application.

Figure 4:
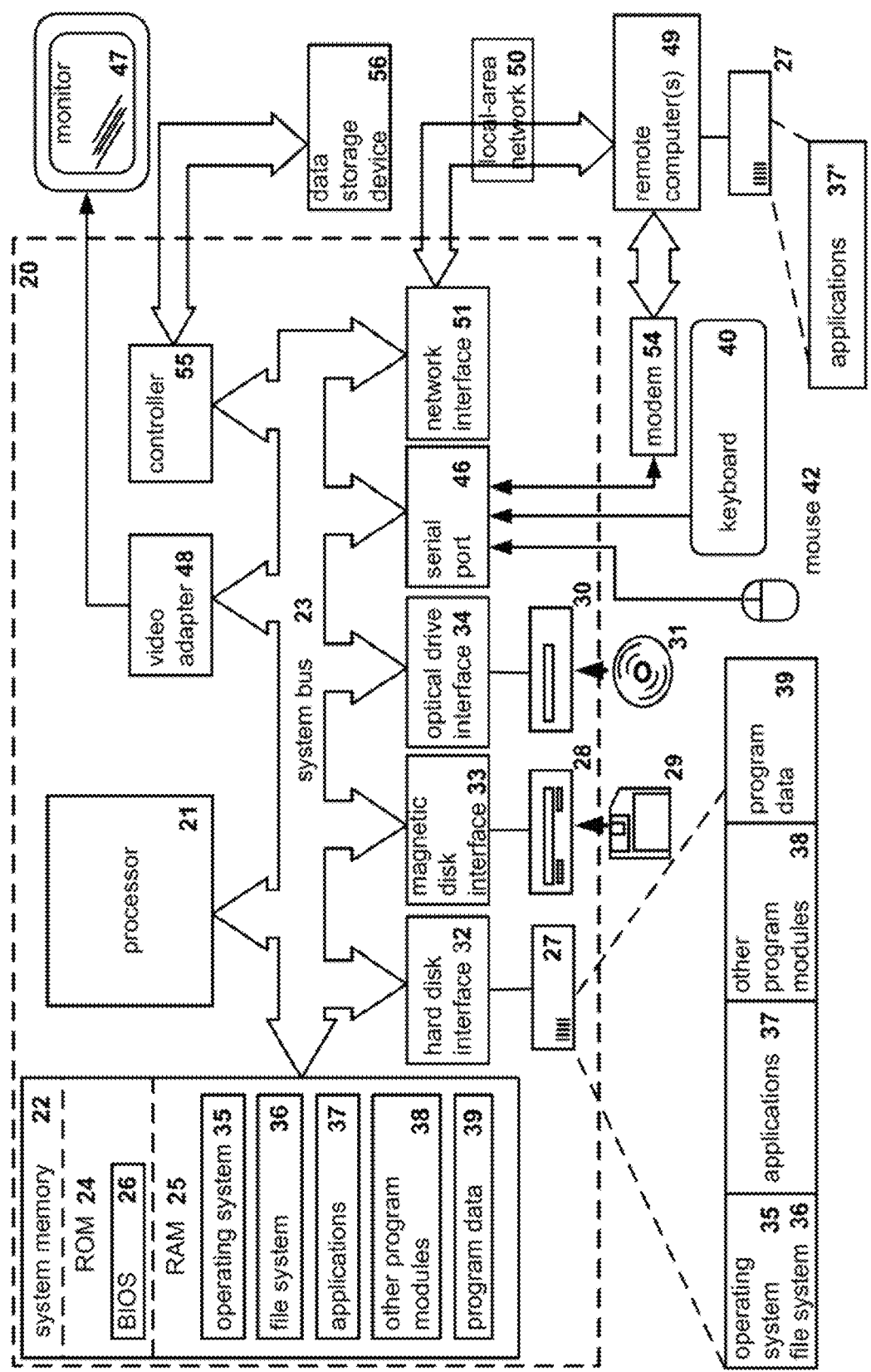
FIG. 4 shows an example of a general-purpose computer system on which are implemented systems and methods for controlling access to applications on a mobile device.

FIG. 4 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) may be used: microphone, joystick, game controller, scanner, and so on. Such input devices usually plug into the computer system 20 through a serial port 46, which in turn is connected to the system bus, but they may be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer may be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 4. Other devices may also be present in the computer network, such as routers, network stations, peer devices or other network nodes.

Network connections may form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 may employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium may comprise RAM, ROM, EEPROM, CD-ROM, Flash memory or other types of electric, magnetic, or optical storage medium, or any other medium that may be used to carry or store desired program code in the form of instructions or data structures and that may be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4 above). Accordingly, each module may be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for controlling access to applications of a mobile device, the method comprising:
   collecting, by a controlled shell of an operating system (OS) of the mobile device, information about at least one application of the mobile device;
   generating a probability distribution associated with the at least one application based on the collected information, the probability distribution indicating a likelihood that the at least one application belongs to a category designation of a plurality of category designations;
   determining the category designation of the application based on the probability distribution;
   determining, by the controlled shell, whether the category designation of the application complies with one or more rules of a usage policy of the mobile device;
   blocking, by the controlled shell, user access to the application if it is determined that a rule exists prohibiting use of applications in the designated category or if no rule exists permitting use of the applications in the designated category; and
   permitting, by the controlled shell, user access to the application if it is determined that a rule exists allowing use of applications in the designated category or if no rule exists prohibiting use of the applications in the designated category refrain.

2. The method of claim 1, wherein the information pertaining to the application includes at least one of application metadata, a hash sum of the application, a name of the application, a license agreement, user instructions, name of company that developed the application, multimedia content, registry key information, age-rating information, drivers, and libraries.

3. The method of claim 1, wherein permitting use of the application comprises permitting use of the application with one or more restrictions that include at least a restriction on time of use, a restriction on duration of use, a restriction on use based on a geographic location of the mobile device, a restriction on use of resources of the mobile device, and a restriction on use based on an active user account.

4. The method of claim 1, further comprising:
   checking after a boot sequence of the mobile device category designations of all applications present on the mobile device;
   determining whether the category designations of each of the applications complies with the one or more rules of a usage policy of the mobile device; and
   blocking or permitting use of each of the applications based on the determination.

5. The method of claim 1, further comprising sending the information pertaining to the application to a categorization module, wherein the categorization module determines the category designation of the application based on the information.

6. The method of claim 1, wherein the generating of the probability distribution associated with the at least one application based on the collected information comprises:
   identifying one or more features from the collected information, wherein a respective feature indicates the category designation to which the at least one application belongs.

7. The method of claim 6, further comprising:
   assigning the application to a first category that is indicated as being a most likely category for the application based on the identified one or more features; or
   assigning the application to a second category that is indicated as being a less likely category for the application with one or more restrictions on a use of the application based on the identified one or more features.

8. The method of claim 1, wherein the controlled shell includes a desktop of the OS that includes clickable shortcuts configured to launch applications.

9. The method of claim 1, further comprising:
   determining that the category designation to which the at least one application belongs is inconclusive,
   wherein the generation of the probability distribution is based on the determination that the category designation is inconclusive.

10. The method of claim 6, wherein the identified one or more features includes a library used by the at least one application.

11. A system for controlling access to applications of a mobile device, the system comprising:
    a hardware processor configured to executed a controlled shell of an operating system (OS) of the mobile device, wherein the controlled shell is configured to collect information about at least one application of the mobile device;
    a categorization module configured to generate a probability distribution associated with the at least one application based on the collected information, the probability distribution indicating a likelihood that the at least one application belongs to a category designation of a plurality of category designations;
    a decision-making module configured to determine the category designation of the application based on the probability distribution;
    the controlled shell further configured to determine whether the category designation of the application complies with one or more rules of a usage policy of the mobile device;
    the controlled shell further configured to block user access to the application if it is determined that a rule exists prohibiting use of applications in the designated category or if no rule exists permitting use of the applications in the designated category; and
    the controlled shell further configured to permit user access to the application if it is determined that a rule exists allowing use of applications in the designated category or if no rule exists prohibiting use of the applications in the designated category.

12. The system of claim 11, wherein the information pertaining to the application includes at least one of application metadata, a hash sum of the application, a name of the application, a license agreement, user instructions, name of company that developed the application, multimedia content, registry key information, age-rating information, drivers, and libraries.

13. The system of claim 11, wherein the controlled shell is further configured to permit use of the application with one or more restrictions that include at least a restriction on time of use, a restriction on duration of use, a restriction on use based on a geographic location of the mobile device, a restriction on use of resources of the mobile device, and a restriction on use based on an active user account.

14. The system of claim 11, wherein the controlled shell is further configured to:

check, after a boot sequence of the OS, the device category designations of all applications present on the mobile device;
determine whether the category designations of each of the applications complies with the one or more rules of a usage policy of the mobile device; and
block or permit use of each of the applications based on the determination.

15. The system of claim 11, wherein the collecting module is further configured to send the information pertaining to the application to a categorization module, wherein the categorization module determines the category designation of the application based on the information.

16. The system of claim 11, wherein the categorization module is configured to generate the probability distribution associated with the at least one application based on the collected information by identification of one or more features from the collected information, wherein a respective feature indicates the category designation to which the at least one application belongs.

17. The system of claim 16, wherein the decision-making module is configured to:
assign the application to a first category that is indicated as being a most likely category for the application based on the identified one or more features; or
assign the application to a second category that is indicated as being a less likely category for the application with one or more restrictions on a use of the application based on the identified one or more features.

18. The system of claim 11, wherein the controlled shell includes a desktop of the OS that includes clickable shortcuts configured to launch applications.

19. A computer program product stored on a non-transitory computer readable medium, for controlling access to applications of a mobile device, wherein the computer program product includes computer executable instructions for:
collecting, by a controlled shell of an operating system (OS) of the mobile device, information about at least one application of the mobile device;
generating a probability distribution associated with the at least one application based on the collected information, the probability distribution indicating a likelihood that the at least one application belongs to a category designation of a plurality of category designations;
determining a category designation of the application based on the probability distribution;
determining, by the controlled shell, whether the category designation of the application complies with one or more rules of a usage policy of the mobile device;
blocking, by the controlled shell, user access to the application if it is determined that a rule exists prohibiting use of applications in the designated category or if no rule exists permitting use of the applications in the designated category; and
permitting, by the controlled shell, user access to the application if it is determined that a rule exists allowing use of applications in the designated category or if no rule exists prohibiting use of the applications in the designated category.

20. The computer program product of claim 19, wherein the information pertaining to the application includes at least one of application metadata, a hash sum of the application, a name of the application, a license agreement, user instructions, name of company that developed the application, multimedia content, registry key information, age-rating information, drivers, and libraries.

21. The computer program product of claim 19, further comprising instructions for permitting use of the application with one or more restrictions that include at least a restriction on time of use, a restriction on duration of use, a restriction on use based on a geographic location of the mobile device, a restriction on use of resources of the mobile device, and a restriction on use based on an active user account.

22. The computer program product of claim 19, further comprising instructions for:
checking after a boot sequence of the mobile device category designations of all applications present on the mobile device;
determining whether the category designations of each of the applications complies with the one or more rules of a usage policy of the mobile device; and
blocking or permitting use of each of the applications based on the determination.

23. The computer program product of claim 19, further comprising instructions for sending the information pertaining to the application to a categorization module, wherein the categorization module determines the category designation of the application based on the information.

24. The computer program product of claim 19, wherein the generating of the probability distribution associated with the at least one application based on the collected information comprises:
identifying one or more features from the collected information, wherein a respective feature indicates the category designation to which the at least one application belongs.

25. The computer program product of claim 24, further comprising instructions for:
assigning the application to a first category that is indicated as being a most likely category for the application based on the identified one or more features; or
assigning the application to a second category that is indicated as being a less likely category for the application with one or more restrictions on a use of the application based on the identified one or more features.

26. The computer program product of claim 19, wherein the controlled shell includes a desktop of the OS that includes clickable shortcuts configured to launch applications.

* * * * *